United States Patent
Sletten et al.

[11] 3,719,946
[45] March 6, 1973

[54] RADAR PHASE COMPARISON SYSTEM INCLUDING A SUPERHETRODYNE RECEIVER

[75] Inventors: Carlyle J. Sletten, Acton; William B. Goggins, Jr., Winchester; Philipp Blacksmith, Concord, all of Mass.

[73] Assignee: The United States of America as represented by the Secretary of the Air Force, Washington, D.C.

[22] Filed: Jan. 27, 1969

[21] Appl. No.: 795,777

[52] U.S. Cl............343/5 SA, 343/5 CD, 343/17.2 R, 343/17.5
[51] Int. Cl.................................................G01s 9/02
[58] Field of Search .................................343/5, 18 B

[56] References Cited

UNITED STATES PATENTS

| 3,374,478 | 3/1968 | Blau | 343/5 |
| 3,397,398 | 8/1968 | Dutton et al. | 343/17.2 X |

*Primary Examiner*—Malcolm F. Hubler
*Attorney*—Harry A. Herbert, Jr. and George Fine

[57] ABSTRACT

A radar system of object recognition wherein multiple coherent harmonic frequency signals are directed towards an object and the return signals therefrom are passed through a superhetrodyne receiver for phase comparison purposes to provide a resultant signal having characteristics distinguishing the object from its background.

3 Claims, 1 Drawing Figure

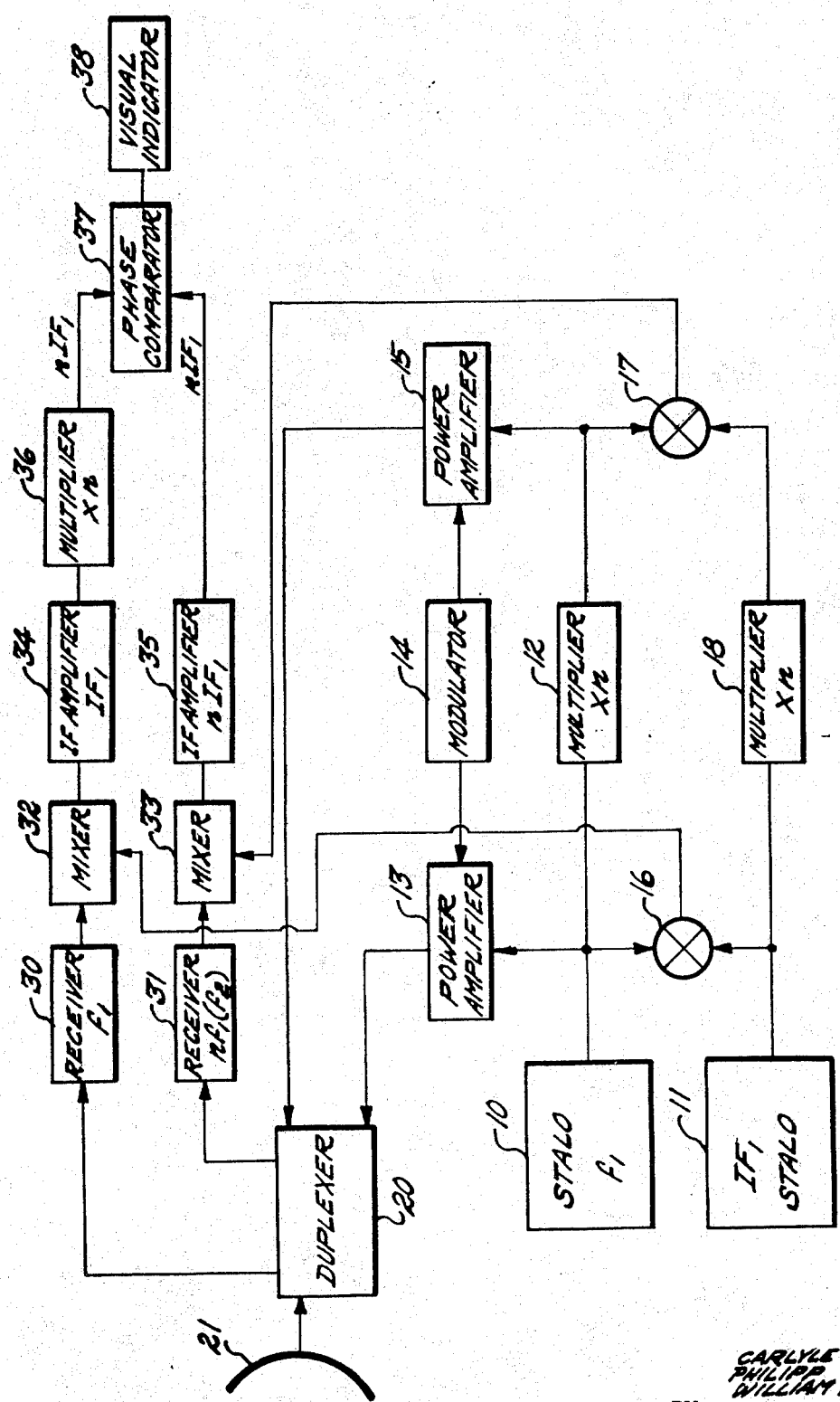

RADAR PHASE COMPARISON SYSTEM INCLUDING A SUPERHETRODYNE RECEIVER

CROSS-REFERENCES TO RELATED APPLICATIONS

Filed at even-date herewith is the U.S. Pat. application Ser. No. 795,775 entitled "A Radar Phase Comparison Method and System For Object Recognition" by Carlyle J. Sletten, Allan C. Schell, Richard B. Mack, William B. Goggins, Jr., and Philipp Blacksmith in which is described a radar method and system of object recognition wherein coherent-harmonic integral signals are transmitted towards the object of interest and the return signals therefrom are phase compared to provide a resultant signal having characteristics distinguishing the object. In addition thereto and also filed at even date herewith is the U.S. Pat. application Ser. No. 795,776 entitled "A Non-Integral Radar Phase Comparison System for Object Recognition" by Carlyle J. Sletten, Philipp Blacksmith and William B. Goggins, Jr., in which is described a radar system of object recognition wherein multiple coherent-harmonic non-integral signals are transmitted towards the object of interest and the return signals therefrom are phase compared to provide a resultant signal having characteristics distinguishing the object.

BACKGROUND OF THE INVENTION

This invention relates to a phase comparison radar system and more particularly to a phase comparison radar system utilizing a superhetrodyne receiver wherein the difference in phase of radar scattering coefficients at multiple frequencies is utilized to distinguish certain features of single or multiple targets. There has been developed in the past phase comparison as a method of radar angle determination on two-port antennas. The 3-D Height Finder System as disclosed by W. G. Mavroides, L. G. Dennett, and L. S. Dorr entitled "3-D Based on Phase-in-Space Principle" in IEEE Trans. on Aerospace and Electronics Systems, Vol. AES-2, No. 3, May 1966, uses a focusing reflector antenna and an extended line source feed with terminals at each end to measure angles within wide search beams. The same principles are being used with two identical low gain antennas operating with a H. F. radar such as disclosed by C. J. Sletten, P. Blacksmith, and C. E. Ellis in "Resonant-Region, Phase Comparison Radar for Detection of Objects in Clutter" in the Proceedings of First Counterinsurgency Research and Development Symposium, held at Institute for Defense Analyses, Arlington, Va., June 14–16, 1966.

The currents and driving E-fields (or voltages) on a metal object in free space have time phase relations which are dependent on object size and configuration. When an object about $\lambda/2$ long is illuminated by a plane wave, it acts very much like an antiresonant circuit which has a rapid change of phase between current and voltage as frequency is varied. In free space, the object is radiating and thus provides a resistive damping term which tends to broaden or flatten the sharp resonant curve one might measure for a tank circuit composed of L-C elements, for example. Thick objects such as rods or curved forms have even broader characteristics. However, characteristic phase shifts do occur for metal objects near resonant dimensions which, when properly instrumented, can be used to distinguish them from echoes from trees, soil, rocks and other lossy scatterers. Large dielectric or metal structures have different characteristic phase vs. frequency responses.

As the scattering from objects is directly related to the currents on the objects the phase between the incident plane wave and the back scattered wave is a measure of the circuit type of current voltage relations in familiar network theory mentioned. One method to find this phase shift at a single frequency is to measure the voltage standing wave ratio in the vicinity of the object. This is impractical at a remote radar site when the distance to the target is not precisely known.

The phase phenomena may be measured by a new technique which is independent of the range to the target and at the same time obtain a gauge of the phase shift as a function of frequency by the use of coherent harmonically related signals.

It is noted that the aforementioned U.S. patent applications did not include a superhetrodyne receiver. Since it is desirable in many applications to utilize superhetrodyning the present invention makes this feature possible. However, in order to include a superhetrodyne receiver and simultaneously utilize the benefits of the prior mentioned patent applications, the system of the present invention is hereby provided.

SUMMARY OF THE INVENTION

The present invention provides a radar system of object recognition wherein coherent harmonically related signals are directed toward the object and the return signals therefrom are passed through a superhetrodyne receiver and then phase compared to provide a resultant signal having characteristics distinguishing the object from its background. The radar of the present invention recognizes scattering objects by the characteristic phase shifts of the scattered signals. This information is separated from other phase shifts due to distance to target, angle of arrival, motion of target, and other causes by the use of multiple transmitted and received frequencies which are in coherent harmonic relation to each other. By suitable superhetrodyne processing and phase comparison of reflected signals, phase information characteristics of the targets are measured and displayed. In particular, metal objects are distinguished from lossy object such as trees or from lossy earth and water surfaces, particularly when the metal targets have dimensions approximately the same as half-wavelengths of one of the transmitted frequencies.

The use of phase reflection coefficients of radar targets as a means of recognizing them and the means for measuring the phase characteristics invariant and undisturbed by other phase changes is one of the uniquely important features of this invention.

It is emphasized the radar of the present invention allows recognition of resonant metal targets in a background of natural reflections from earth and vegetation. The radar also makes possible direct measurement of the maximum dimensions of aircraft or other metal objects by suitable choice of harmonic frequencies. It is noted also that the present radar may be utilized in reconnaissance-strike operations seeking trucks, tanks, missile sites on the earth's surface, and for attacking low flying aircraft by detecting them against terrain background. It is also useful for the identification (IFF) of aircraft by measuring the maximum dimensions.

An object of the present invention is to provide a radar system utilizing a superhetrodyne receiver which recognizes scattering objects by the characteristic phase shifts of the scattered signal.

Another object of the present invention is to provide a radar system including a superhetrodyne receiver for utilizing the phase reflection coefficients of radar targets as a means of recognition.

Still another object of the present invention is to provide a radar system including a superhetrodyne receiver for utilizing the phase reflection coefficients of radar targets for recognition purposes wherein the measured phase characteristics of the radar targets are invariant and undisturbed by other phase changes.

Yet another object of the present invention is to provide a radar system including a superhetrodyne receiver to distinguish certain features of single and multiple targets by the use of the difference in the phase of radar scattering coefficients at harmonically related frequencies.

The various features of novelty which characterize this invention are pointed out with particularity in the claims annexed to and forming a part of this specification. For a better understanding of this invention, however, its advantages and specific objects obtained with its use, reference should be had to the accompanying drawings and descriptive matter in which is illustrated and described a preferred embodiment of the invention.

BRIEF DESCRIPTION OF THE DRAWINGS

In the drawings:

The single FIGURE shows a block diagram of the preferred embodiment of the invention including a superhetrodyne receiver.

DESCRIPTION OF THE PREFERRED EMBODIMENT

Now referring to the single FIGURE of the invention, there is shown stabilized oscillators 10 and 11 generating signals having frequencies $f_1$, and $IF_1$, respectively. The signal $f_1$ is to be the transmitted signal and the signal $IF_1$ represents an intermediate frequency for further utilization. Oscillators 10 and 11 may be similar to the type of stabilized oscillator known as STALO or may be radar oscillators having a high degree of stability. The signal $f_1$ is fed to multiplier 12 which is designed to multiply an input by a constant, $n$. In general, $n$ will be in the order of 2. The output of multiplier 12 is harmonically related to the signal $f_1$ and is designated as signal $f_2$ which is equal to $nf_1$.

The signals $f_1$ and $f_2$ are fed to power amplifiers 13 and 15, respectively. Modulator 14 is simultaneously connected to amplifiers 13 and 15 and thus provides pulsed outputs therefrom. The modulated output signals $f_1$ and $f_2$ from power amplifiers 13 and 15, respectively, are passed through conventional duplexer 20 to broadband antenna 21. Antenna 21 directs the pulsed radar signals towards the target or targets of interest. The pulsed radar signals are comprised of a pair of preselected coherent harmonically related frequencies.

In addition to the foregoing at the transmitter portion of the radar system, the signal $f_1$ is mixed with the signal $IF_1$ in mixer 16 with the difference frequency result of the mixing being $LO_1 = f_1 - IF_1$. The signal $IF_1$ is simultaneously multiplied by $n$ in multiplier 18 to provide a signal $nIF_1$. The signals $nIF_1$ and $nf_1$ ($f_2$) are mixed in mixer 17 resulting in an output $LO_2 = nf_1 - nIF_1$.

The return echoes from the target or targets of interest are received by antenna 2 and pass through duplexer 20 and are fed simultaneously to receivers 30 and 31 which are tuned to frequencies $f_1$ and $f_2$ ($nf_1$) respectively, to remove image frequencies. After the return signals $f_1$ and $f_2$ are amplified by receivers 30 and 31, respectively, they are mixed with $LO_1$ and $LO_2$ in mixers 32 and 33, respectively. The results are $f_1 - LO_1 = IF_1$ and $f_2 - LO_2 = nf_1 - nf_1 + nIF_1 = nIF_1$. Thus, intermediate frequencies which are harmonically related are generated and are amplified by intermediate frequency amplifiers 34 and 35 which are tuned to $IF_1$ and $nIF_1$, respectively. The output from amplifier 34 is multiplied by $n$ and then fed to phase comparator 37 simultaneously with the output from intermediate amplifier 35. The resultant signal from phase comparator 37 which is a phase difference signal is then fed to visual display 38 which may be a conventional radar type indicator connected in the conventional manner.

For a narrow beam search radar manning a surface for metal objects against a wooded background, a PPI display could convert the phase difference between incoming signals to color on the oscilloscope screen as is done in color television by phase comparison.

Thus, there is provided a unique system of phase comparison including a superhetrodyne receiver to distinguish certain features of single or multiple targets by utilizing the difference in the phase of radar scattering coefficients at harmonically related frequencies. It is emphasized that scattering objects such as radar targets are recognized by the characteristic phase shifts of the scattered signals. This information is separated from other phase shifts due to distance to the target, angle of arrival, motion of the target, and other causes by the use of two transmitted and received frequencies which are in coherent harmonic relation to each other. By suitable processing and phase comparison of reflected signals received at different frequencies simultaneously, phase information characteristics of the targets is measured and displayed. In particular, metal targets are distinguished from returns from lossy objects such as trees or from lossy earth and water surfaces, particularly when the metal targets have dimensions approximately the same as half-wavelengths of one of the two transmitted frequencies. It is also noted the instrumentation of the phase information using color display as in television to present characteristics of the targets to the radar observer is unique when the phase information is derived from the reflection characteristics of the targets. It is further noted that the present system allows direct measurement of the maximum dimensions of aircraft or other metal objects by suitable choice of harmonic frequencies.

While in accordance with the provisions of the statutes, we have illustrated and described the best form of the invention now known to us, it will be apparent to those skilled in the art that changes may be made in the form of the system disclosed without departing from the spirit of the invention as set forth in the appended claims, and that in some cases certain features of the invention may be used to advantage without a corresponding use of other features.

Having now described out invention, what we claim as new and desire to secure Letters Patent is:

1. A radar system including a superhetrodyne receiver for recognizing signal scattering targets such as aircraft and tanks by the characteristic phase shifts of the scattered return signals therefrom comprising first stable means to generate a first signal of preselected frequency, said preselected frequency being directly related to the size of said signal scattering targets, first means to multiply the frequency of said first signal by a preselected constant $n$ to provide a second signal coherently, harmonically related to said first signal, means to separately amplify said first and second signals to provide high power thereto, means to modulate said amplifying means to provide pulse outputs therefrom, means to transmit said first and second pulse high power signals toward said signal scattering targets, second stable means to generate a third signal of preselected intermediate frequency differing in frequency from said first and second signals, means to mix said first signal with said third signal to provide a predetermined first difference signal, second means to multiply said third signal by said preselected constant $n$ to provide a fourth signal, second means to mix said second signal and said fourth signal to provide a predetermined second difference signal, antenna means to receive said scattered signals from said signal scattering targets, first receiver means to amplify said received signals, said first receiver means being tuned to the frequency of said first signal, second receiver means to amplify said received signals, said second receiver means being tuned to the frequency of said second signal, third mixer means receiving simultaneously the output from said first receiver means and said first difference signal, fourth mixer means receiving simultaneously the output from said second receiver and said second difference signal, first and second intermediate amplifiers passing the outputs from said third and fourth mixers, respectively, third means to multiply the output from said first intermediate amplifier by said constant $n$, and means to phase compare the output signal from said third multiplying means to the output signal from said second intermediate amplifier to provide a resultant signal representative of said signal scattering targets.

2. A radar system as described in claim 1 further including means to visually display said resultant signal.

3. A radar system as described in claim 1 wherein said modulator means is comprised of a pulser.

* * * * *